US006130625A

United States Patent [19]

Harvey

[11] Patent Number: 6,130,625

[45] Date of Patent: *Oct. 10, 2000

[54] UNIVERSAL REMOTE CONTROL WITH INCOMING SIGNAL IDENTIFICATION

[75] Inventor: Michael Lee Harvey, Danville, Calif.

[73] Assignee: Chambord Technologies, Inc., Danville, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,298

[22] Filed: Jan. 24, 1997

[51] Int. Cl.[7] ..................... H04Q 1/00

[52] U.S. Cl. .................... 340/825.72; 359/142; 341/176; 348/734

[58] Field of Search ......................... 340/825.69, 825.72, 340/825.22; 341/176; 348/734; 359/142

[56] References Cited

U.S. PATENT DOCUMENTS

| | | | |
|---|---|---|---|
| 4,623,887 | 11/1986 | Welles, II . | |
| 4,626,848 | 12/1986 | Ehlers . | |
| 4,750,118 | 6/1988 | Heitchel | 340/825.69 |
| 4,825,200 | 4/1989 | Evans | 340/825.72 |
| 4,856,081 | 8/1989 | Smith | 340/825.69 |
| 4,866,434 | 9/1989 | Keenan | 340/825.72 |
| 4,905,279 | 2/1990 | Nishio | 340/825.72 |
| 4,999,622 | 3/1991 | Amano | 340/825.72 |
| 5,194,978 | 3/1993 | Heep . | |
| 5,410,326 | 4/1995 | Goldstein | 340/825.72 |
| 5,680,115 | 10/1997 | Sim | 340/825.72 |
| 5,699,055 | 12/1997 | Dykema | 340/825.72 |

*Primary Examiner*—Brian Zimmerman
*Attorney, Agent, or Firm*—Aileen Champion Addessi

[57] ABSTRACT

A remote control for consolidating several native remote controls of consumer electronic devices identifies, stores and re-transmits signals of the other remote controls for operating several of the electronic devices with one remote control unit. The remote control includes a receiver, a microprocessor, memory, and a transmitter. The remote control identifies a Protocol or transmission technique of each native remote control by comparing a transmitted signal from the native remote control to a preprogrammed data base of Protocols of the universal remote control. During the identification process, frequency and cycle count are detected to determine a Protocol carrier family. Pause and bit modulation information of the transmitted signal are detected for further refining the selection of the Protocol from the preprogrammed data base of Protocols. Finally, a second signal is examined to make the final selection of the correct Protocol. By knowing the bit modulation technique or how the bit is being sent, the universal remote control detects the code pattern of the transmitted signal and stores the code pattern and identified Protocol for later re-transmission to remotely control the electronic device.

20 Claims, 4 Drawing Sheets

UNIVERSAL REMOTE CONTROL WITH INCOMING SIGNAL IDENTIFICATION

BACKGROUND OF THE INVENTION

The invention relates to remote controls and, more particularly, to universal remote controls for use with consumer electronic products.

Consumer electronic devices commonly are controlled by a remote control. A consumer may have a separate remote control for a television, a stereo, a video cassette recorder, or other such device. The convenience of remotely controlling these devices is reduced by having to locate a specific remote for a specific device or carrying around several remote controls. It is preferable to have a single remote control for controlling each of the several devices.

Two types of universal remote controls which are currently in the marketplace for consolidating several remote controls into a single remote control unit are preprogrammed and learning. Since each manufacturer uses a different bit pattern for carrying out a specific operation and uses a different method of transmitting the pattern, the preprogrammed remote control has a large data base of codes, devoting a large part of its internal memory to the storage of these codes. Each consumer chooses only a few codes to see if those codes will control their consumer electronic devices. To save on the cost of parts of the preprogrammed remote control, some codes will be left out of the data base, making the resulting product useful to a subset of potential customers.

A learning type of remote control is disclosed in U.S. Pat. No. 4,623,887 issued Nov. 18, 1986 to Welles, II and entitled "Reconfigurable Remote Control" and in U.S. Pat. No. 4,626,848 issued Dec. 2, 1986 to Ehlers and entitled "Programmable Functions for Reconfigurable Remote Control". The infrared codes of each remote control are transmitted into the universal remote control, which learns or memorizes the codes. The data is compressed and stored for later use.

However, learning remote controls cannot learn all infrared codes. Learning remote controls typically concentrate on the carrier and inter-carrier pauses, missing other information crucial to an accurate representation of a true signal. For example, several manufacturers send data at the beginning or the end of a transmission that is different than the data throughout the middle of the transmission. Others send different data each time the same key is pressed, or send multiple carriers in one transmission that is difficult to detect by a sampling and averaging method of the learning remote control.

U.S. Pat. No. 5,194,978 issued to Heep on Mar. 16, 1993 and entitled "Timer System for Learning and Replaying of Infrared Signals" discloses a timer method used to learn an infrared transmission from a native remote control. The remote controller determines which of four modes of transmission a signal is transmitted in, including carrier mode, pulse mode, frequency shift keying mode and continuous wave mode. Once the device knows the transmission method, it can set its internal timers to detect the infrared pulses and pauses between the pulses for detecting the data.

However, the transmission method is only a part of the information contained in the bit modulation technique, which is a part of a Protocol. For example, the carrier mode of transmission can be employed to create several bit modulation schemes or techniques. The bit modulation technique is one parameter of the Protocol. By detecting only a portion of the Protocol, the problem of overall recognition of the complete signal is not solved. Also, the device does not solve the problem of memory storage space due to the necessity of storing timing information in addition to other relevant information.

Therefore, what is needed is an apparatus and method for remotely controlling consumer electronic devices which utilizes a comparative approach of identifying a transmission technique and using that technique to detect and store the specific infrared code for later re-transmission.

SUMMARY OF THE INVENTION

A remote control with infrared Protocol identification for controlling several electronic devices, each being controlled individually by a native remote control, includes receiver means for receiving at least one signal transmitted by the native remote control during an identifying mode. A first memory means has a preprogrammed data base of Protocols. A microprocessor is connected to receive an output of the receiver means and is connected to the memory means. The microprocessor has an identifying means for comparing the preprogrammed data base of Protocols with the signals transmitted by the native remote control for identifying a Protocol of the native remote control, and has detector means for using the identified Protocol to detect data transmitted from the native remote control as "1"s and "0"s for identifying a code pattern for controlling the electronic device. A second memory means is connected to the microprocessor for storing the identified Protocol and the code pattern. A transmitter means is connected to the microprocessor for re-transmitting the identified code pattern using the identified Protocol for controlling the electronic device with the remote control with infrared identification.

The microprocessor further includes means for detecting frequency and cycle count of the signal transmitted by the native remote control and means for comparing the preprogrammed data base of Protocols with the frequency and the cycle count for identifying a Protocol carrier type of the native remote control. The microprocessor may further include means for detecting pause and bit modulation information of the signal transmitted by the native remote control according to the Protocol carrier type for providing an identified Protocol specific to the native remote control.

A method of identifying, storing and re-transmitting data from any of a plurality of remote controls, comprises the steps of receiving a transmitted signal from one of the remote controls and identifying a Protocol from a preprogrammed data base of Protocols by comparing the transmitted signal with the preprogrammed data base. A code pattern is detected from the transmitted signal by using the identified Protocol, and the identified Protocol and the code pattern are stored in memory. Using the identified Protocol, the code pattern can be re-transmitted for remotely controlling an electronic device.

The step of detecting a code pattern can be repeated for identifying changes in the code pattern. The data of the identified Protocol and the identified code pattern or patterns can be adjusted for providing a Protocol and a code pattern which are substantially similar to the transmitted signal from the remote control. Start and stop commands transmitted by some electronic devices may also be detected for assisting in the final determination of a Protocol.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and method for consolidating the many remote controls, hereinafter referred to as native remote controls, in a home to a universal remote control.

Figure 1:
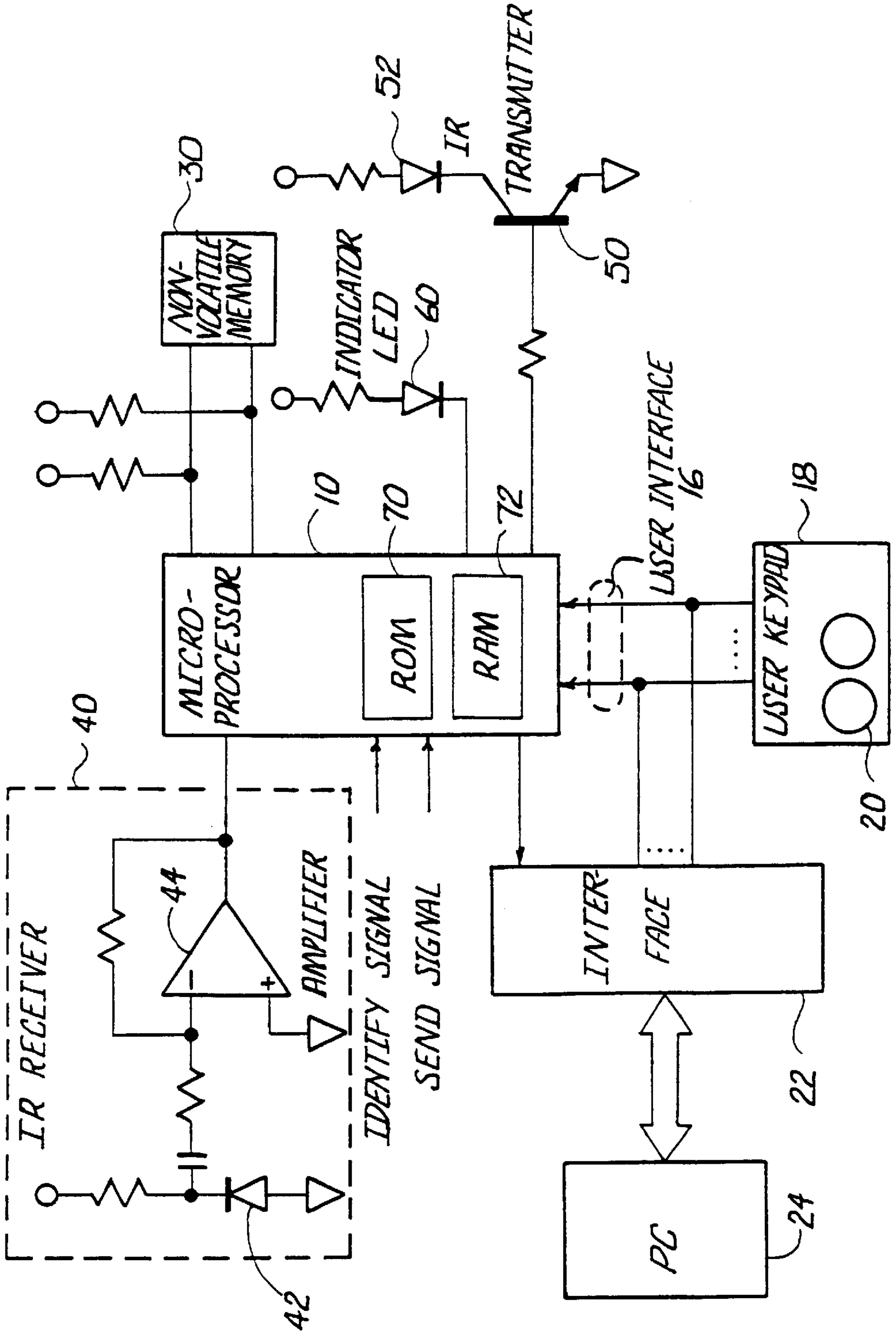
FIG. 1 is a schematic diagram of a remote control circuit.

Referring to FIG. 1, the universal remote control includes a microprocessor 10, which is the central control unit for the system. The microprocessor 10 is connected through interface 16 to a keypad 18 having keys 20 for providing a stand alone remote control unit. Alternatively, the microprocessor 10 may be connected through an interface 22 to a personal computer 24 or other system for providing a subsystem to a larger system. The microprocessor 10 receives data from both a user interface, such as the user keypad 20 or the personal computer 24, and from memory, such as local non-volatile memory 30.

A receiver 40 for the remote control detects an infrared signal from a native remote control and transfers the information to the microprocessor 10. The receiver 40 has an infrared diode 42 and which is connected to an amplifier 44. The amplifier 44 is connected to an input of the microprocessor 10.

A transmitter 50 for the remote control is connected to an output of the microprocessor 10 and is connected to an infrared light emitting diode 52 for transmitting an infrared signal to an appliance or consumer electronic device for operation of the device by use of the universal remote control.

A LED indicator 60 is connected to the microprocessor for emitting visible red light for signaling the user of the remote control. Alternatively, if the microprocessor is a subsystem for a larger system, an “OK” message may be sent to a personal computer, or the like.

The universal remote control has a preprogrammed, internal data base of transmission techniques, hereinafter referred to as Protocols. The preprogrammed data base of Protocols is a tabular look-up table stored in the read only memory (ROM) 70 of the microprocessor 10. Alternatively, the preprogrammed data base may be stored in external memory.

There are approximately 50 Protocols commonly in use in North, South and Central America. Inherent in each Protocol are the different infrared transmission parameters that constitute such transmission. These parameters are the carrier frequency or frequencies (or none), the bit modulation technique, the start method that may be required to alert the receiver (if any), the number of data bits and their type (such as Address and Function), the waiting period between re-transmissions (if any) while the button is still energized by the user, the repeat technique which may be identical to the first transmission or different, and the end method, which may indicate that the user has released the key that had been pressed.

Figure 2A:
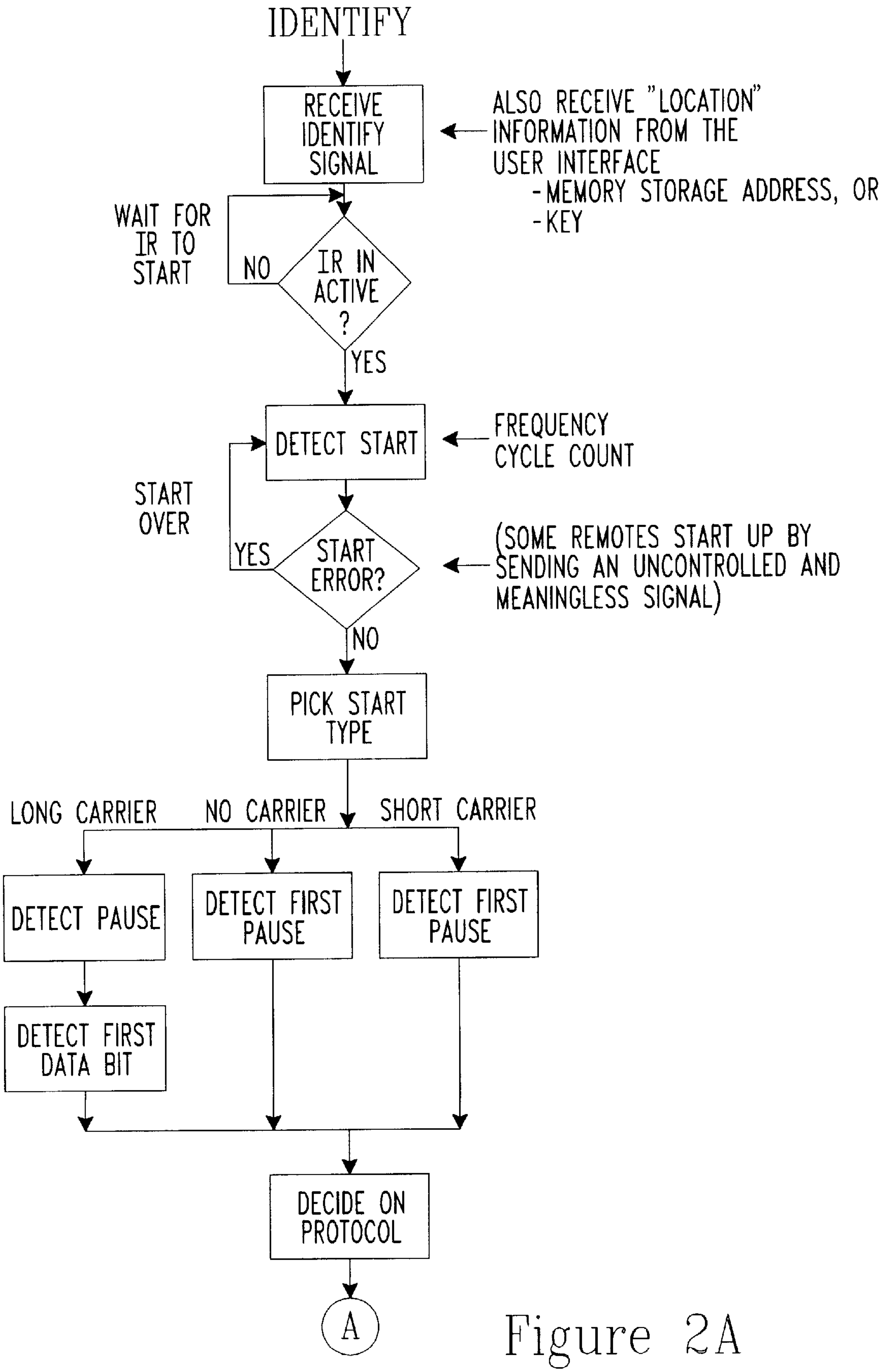
FIG. 2 (consisting of FIG. 2A and FIG. 2B) is a flow chart of an identify program.
Figure 2B:
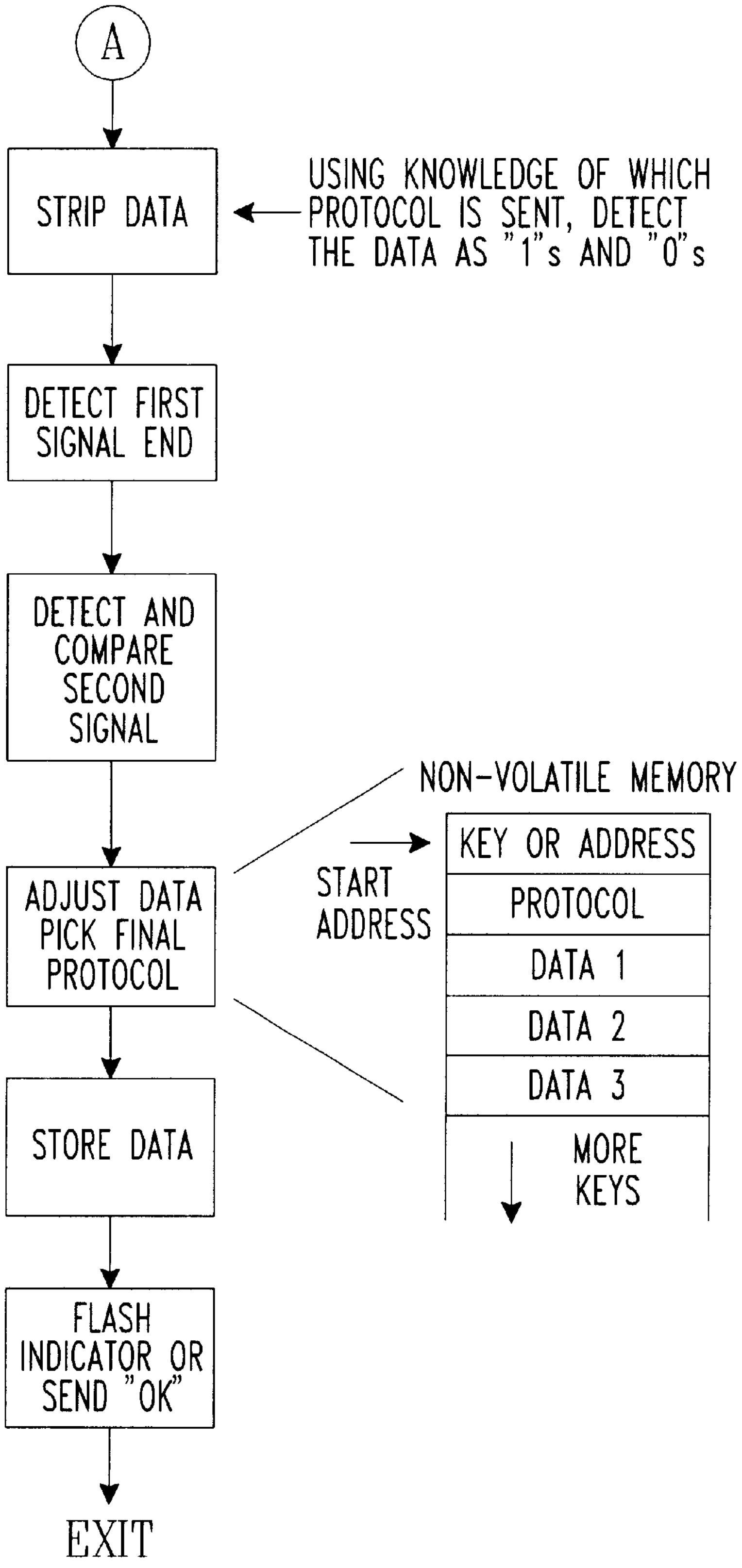

Referring to FIG. 1 and to the flowchart in FIG. 2, the microprocessor 10 receives an identify signal from the user interface 16. For example, the user may press a key on the keypad of the remote control labeled “Identify” to notify the microprocessor that the system is to identify a new code. Additionally, the microprocessor 10 receives location information from the user interface 16, such as where to store the new code or the memory storage address. For example, the user may press a key on the keypad 18 of the remote control labeled “power”, “channel up”, “volume up”, or the like, for assigning a function to the new code.

The microprocessor 10 waits for the infrared signal to start. The user points the native remote control transmitter toward the universal remote control receiver 40 and presses the function key on the native remote control to transmit the infrared signal from the native remote control to the universal remote control. A transmission is defined as a signal that emanates from the native remote control during the entire time a key is pressed down. A signal is defined as that part of a transmission that holds some part or all of the unique information sent during the transmission and is separated in time from the other signals in the transmission.

Different Protocols send different kinds of signals during a transmission. As an example, some Protocols send the information once, in which case, the signal and transmission are identical. Other Protocols send the same signal repeatedly until the key is lifted, or send the signal only a set number of times. As another example, some Protocols send a start code, then data, and finish with a stop code when the key is lifted. During this type of transmission, two different kinds of signals are sent at different times. The first signal is the start code followed by a long pause or Inter Word Gap which separates the signals. The next or second signal sent contains the data code, which is re-transmitted, separated from other identical signals by the Inter Word Gap, for as long as the key is down. When the key is lifted, the first signal is sent again, as a stop signal.

After the infrared signal is detected by the receiver 40 of the universal remote control, a detection process is started. During the detection process, the microprocessor 10 detects the frequency and cycle count of the transmitted infrared signal.

If a start error is detected, the detection process is started over again. As an example, a start error may occur when a native remote control sends an initial uncontrolled and meaningless signal when its key is first pressed.

The transmitted data is compared to the universal remote control’s preprogrammed, internal data base of transmission techniques or Protocols, to know how the control information should be re-transmitted. The information detected identifies the kind of Protocol or transmission technique being sent by the native remote control. The microprocessor uses characteristics of the detected signal to differentiate among the Protocols stored in the look-up table of the preprogrammed data base for selecting or identifying a Protocol used by the native remote control.

Using the detected frequency and cycle count of the transmitted infrared signal, the Protocol family, such as a long carrier Protocol, short carrier Protocol, no carrier Protocol, or other, is selected.

For each of the Protocol families, a first pause of the transmitted signal is then detected. The pause is a first non-carrier period following a carrier signal or single non-carrier flash. For a short carrier, a data bit is a first carrier followed by a first pause. The bit modulation scheme is already known at this point.

For the long carrier Protocol, in addition to the detection of the first pause, a first data bit is also detected. The data bit is the short carrier and short pause that occurs right after the long carrier followed by a long pause. The bit modulation scheme is being identified at this point. An analysis of the pause and data bit information, enables the microprocessor to identify a specific Protocol that was sent by the native remote control from each family of Protocols stored in the ROM 70.

Once the Protocol is identified, the microprocessor then understands the bit modulation technique chosen that differentiates a "1" from a "0". Using the identified method of distinguishing between a "1" and a "0", the microprocessor 10 is used to detect or strip the data of the native remote control as "1"s and "0"s for identifying a code pattern.

For transmissions having two different signals, for example Protocols with start and stop commands, a first and a second signal are detected. The observation of the second signal in a transmission enables the data contained in the second signal, which is different than the data in the first signal, to be stripped or detected. Also, by observing the second signal for its characteristics, a determination of the identified Protocol can be made by selecting one of several similar Protocols. For those Protocols that send different data in two separate signals, the two signals must be observed before all the information imbedded in the transmission is obtained. The data is adjusted accordingly so that the data received by the universal remote control is identical to the data transmitted by the native remote control.

When the identification process is complete, a local microprocessor memory (RAM) 72 contains the identified Protocol number (1 byte), stripped data (up to 4 bytes), and retrieval information (1 byte) for use in later re-transmission. In all, each identified native, infrared transmission requires six bytes to fully characterize it.

After the microprocessor 10 detects that the infrared signal has ended, the system may be programmed to repeat the identify process to verify or confirm that the transmitted signal from the native remote control was detected accurately by the universal remote control.

The data is stored in the non-volatile memory 30 for re-transmission at a later time. The LED indicator 60 will flash or an "OK" message will be sent indicating that the identify process is complete.

Figure 3:
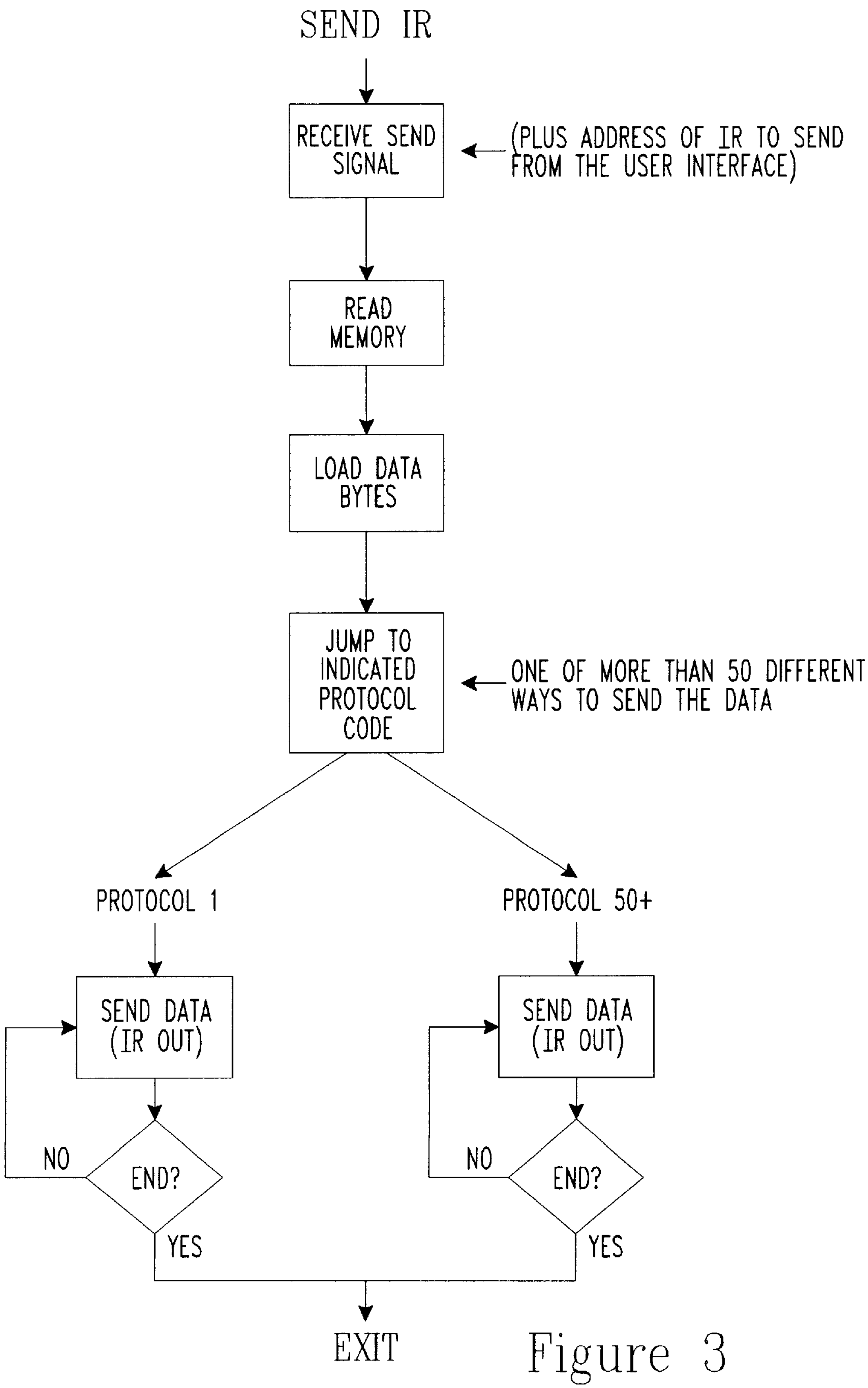
FIG. 3 is a flow chart of a send program.

Referring to FIG. 1 and to the flowchart in FIG. 3, when subsequently requested to re-transmit the already identified signal, the stripped data is sent using the identified, preprogrammed Protocol. The microprocessor 10 of the universal remote control receives a send signal from the user interface. For example, the user may press a key on the keypad labeled "power", "channel up", or "volume up", earlier used to indicate which signal was to be identified. Additionally, the address of the infrared signal to be sent may be provided by another interface to a larger system.

The microprocessor 10 reads the data stored in the local non-volatile memory 30 and loads the data bytes. The indicated Protocol code also stored in the local non-volatile memory 30 is used to send the data. The transmitter 50 sends or transmits the data as an infrared signal to the particular electronic device that the user wishes to operate. When the user releases the key, it is detected by the microprocessor 10 which exits the send program.

An advantage of the universal remote control with infrared identification is that new Protocols are rarely introduced into consumer electronic products so that it is simpler to develop a system for storing codes necessary to activate and control consumer electronic devices in a home, if only the Protocols are required to be preprogrammed. The universal remote control which stores Protocols would not have to be upgraded as often as the library of codes of each model and manufacturer of an electronic device changes. Such changes may require an upgrade to a preprogrammed remote control with each newly designed consumer electronic product. Although each newly designed product has a new transmission code, a known and popular Protocol is usually used for the transmission technique.

The comparative approach of the universal remote control does not use a large amount of memory reducing the cost of the microprocessor. Also, the comparative approach reduces the possibility of re-transmission mistakes of infrared transmissions it has detected and for which it has been preprogrammed to replicate, as is commonly a problem of learning remote controls.

Thus there has been shown and described a novel universal remote control with infrared identification which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A remote control with infrared identification for controlling several electronic devices, each being controlled individually by a native remote control, comprising:

receiver means for receiving at least one signal transmitted by the native remote control during an identifying mode;

first memory means having a preprogrammed data base of Protocols, said Protocol including carrier frequency, bit modulation techniques, start methods, number of data bits and the data bit's type, waiting period between re-transmissions, repeat technique, and end methods;

a microprocessor, connected to receive an output of said receiver means and connected to said first memory means, having an identifying means for comparing said preprogrammed data base of Protocols with said signal transmitted by the native remote control for identifying a Protocol of said native remote control, and having detector means for using said identified Protocol to strip data transmitted from said native remote control as "1"s and "0"s for identifying a code pattern for controlling said electronic device;

second memory means connected to said microprocessor for storing said identified Protocol and said code pattern, and transmitter means connected to said microprocessor for re-transmitting said code pattern using said identified Protocol for controlling the electronic device with said remote control with infrared identification.

2. The remote control according to claim 1, wherein said microprocessor includes means for detecting frequency and cycle count of said signal transmitted by the native remote control.

3. The remote control according to claim 1, wherein said microprocessor includes means for detecting pause and bit modulation information of said signal transmitted by the native remote control.

4. The remote control according to claim 1, further comprising a keypad interfaced with said microprocessor for relaying information from a user to said microprocessor.

5. The remote control according to claim 4, wherein said keypad has an identify key for enabling a user to depress said identify key for activating the identifying mode of said remote control.

6. The remote control according to claim 1, further comprising adjustment means for further defining said identified Protocol so that said identified Protocol corresponds to said transmitted signal of the native remote control.

7. The remote control according to claim 1, further comprising an indicator connected to said microprocessor for communicating to a user that said code pattern has been identified.

8. A remote control with infrared identification for controlling several electronic devices, each being controlled individually by a native remote control, comprising:

receiver means for receiving at least one signal transmitted by the native remote control during an identifying mode;

first memory means having a preprogrammed data base of Protocols;

a microprocessor, connected to receive an output of said receiver means and connected to said first memory means, further including, means for detecting frequency and cycle count of said signal transmitted by the native remote control;

means for comparing said preprogrammed data base of Protocols with said frequency and said cycle count for identifying a Protocol carrier family of said native remote control;

means for detecting pause and bit modulation information of said signal transmitted by the native remote control according to said Protocol carrier family for providing an identified Protocol specific to said native remote control; and means for detecting data transmitted from said native remote control as "1"s and "0"s, using said identified Protocol, for identifying a code pattern for controlling said electronic device;

second memory means connected to said microprocessor for storing said identified Protocol and said code pattern; and transmitter means connected to said microprocessor for re-transmitting said identified code pattern using said identified Protocol for controlling the electronic device with said remote control with infrared identification.

9. The remote control according to claim 8, further comprising adjustment means for further defining said identified Protocol so that said identified Protocol corresponds to said transmitted signal of the native remote control.

10. The remote control according to claim 8, further comprising input means for enabling a user to provide an identify command and location information for activating an identify mode of the remote control and assigning a memory address for said identified Protocol and said code pattern.

11. A method of identifying, storing and re-transmitting data from any of a plurality of native remote controls, comprising the steps of:

receiving a transmitted signal from one of said native remote controls;

identifying a Protocol from a preprogrammed data base of Protocols by comparing said transmitted signal with said preprogrammed data base;

detecting a code pattern from said transmitted signal by using said identified Protocol;

storing said identified Protocol and said identified code pattern; and re-transmitting said identified code pattern using said identified Protocol for remotely controlling an electronic device.

12. The method according to claim 11, further comprising the steps of detecting a second transmitted signal from said native remote control for detecting said code pattern and for providing additional information for identifying said Protocol; and adjusting data of said identified Protocol and said identified code pattern for providing a Protocol and a code pattern which are substantially similar to said transmitted signal from said remote control.

13. The method according to claim 11, wherein the step of identifying a Protocol includes the step of detecting frequency and cycle count of said transmitted signal.

14. The method according to claim 13, wherein the step of identifying said Protocol includes the step of determining a carrier Protocol family by comparing said frequency and said cycle count with said preprogrammed data base.

15. The method according to claim 11, wherein the step of identifying said Protocol includes the step of detecting a pause of said transmitted signal from the native remote control.

16. The method according to claim 15, wherein the step of identifying said Protocol includes the step of detecting bit modulation of said transmitted signal from the native remote control.

17. The method according to claim 11, wherein the step of re-transmitting includes the steps of:

receiving a send signal indicating to a microprocessor to transmit said identified code pattern;

reading data stored in memory;

loading data from said memory including said identified code pattern and said identified Protocol; and using said identified Protocol to send said identified code pattern.

18. The method according to claim 11, further comprising the step of detecting a start and a stop command transmitted by the native remote control.

19. The method according to claim 11, further comprising the step of indicating that said code pattern has been identified.

20. The method according to claim 11, further including the step of receiving an identify signal and location information from a user for activating an identify mode and assigning a memory address.

* * * * *